(12) United States Patent
Jang et al.

(10) Patent No.: US 10,604,688 B2
(45) Date of Patent: Mar. 31, 2020

(54) SILICONE PRESSURE-SENSITIVE ADHESIVE COMPOSITION

(71) Applicant: Dow Silicones Corporation, Midland, MI (US)

(72) Inventors: Wonbum Jang, Chungchungbukdo (KR); Gunn Jo, Chungchungbukdo (KR); Bokyung Kim, Gyeonggi-do (KR)

(73) Assignee: Dow Silicones Corporation, Midland, MI (US)

(*) Notice: Subject to any disclaimer, the term of this patent is extended or adjusted under 35 U.S.C. 154(b) by 77 days.

(21) Appl. No.: 16/061,842

(22) PCT Filed: Dec. 12, 2016

(86) PCT No.: PCT/US2016/066123
§ 371 (c)(1),
(2) Date: Jun. 13, 2018

(87) PCT Pub. No.: WO2017/106087
PCT Pub. Date: Jun. 22, 2017

(65) Prior Publication Data
US 2018/0362816 A1 Dec. 20, 2018

Related U.S. Application Data

(60) Provisional application No. 62/267,323, filed on Dec. 15, 2015.

(51) Int. Cl.
| | | |
|---|---|---|
| *C09J 183/04* | (2006.01) | |
| *C08K 5/56* | (2006.01) | |
| *C08L 83/00* | (2006.01) | |
| *C08K 13/00* | (2006.01) | |
| *C08J 3/09* | (2006.01) | |
| *C09J 7/38* | (2018.01) | |
| C08G 77/12 | (2006.01) | |
| C08G 77/20 | (2006.01) | |
| C08G 77/04 | (2006.01) | |

(52) U.S. Cl.
CPC ............. *C09J 183/04* (2013.01); *C08J 3/091* (2013.01); *C08J 3/092* (2013.01); *C08J 3/095* (2013.01); *C08K 5/56* (2013.01); *C08K 13/00* (2013.01); *C08L 83/00* (2013.01); *C09J 7/38* (2018.01); *C08G 77/04* (2013.01); *C08G 77/12* (2013.01); *C08G 77/20* (2013.01); *C08G 2170/40* (2013.01)

(58) Field of Classification Search
None
See application file for complete search history.

(56) References Cited

U.S. PATENT DOCUMENTS

| | | | |
|---|---|---|---|
| 2,676,182 A | 4/1954 | Daudt et al. | |
| 3,284,406 A | 11/1966 | Nelson | |
| 4,591,622 A * | 5/1986 | Blizzard | ............... C09J 183/10 524/500 |
| 5,190,827 A | 3/1993 | Lin | |
| 5,357,007 A | 10/1994 | Wengrovius et al. | |
| 2004/0122142 A1 | 6/2004 | Meguriya | |
| 2010/0104865 A1 | 4/2010 | Mizuno et al. | |
| 2010/0168313 A1 | 7/2010 | Mizuno et al. | |
| 2011/0097579 A1 | 4/2011 | Mizuno et al. | |
| 2014/0114029 A1 | 4/2014 | Cray et al. | |
| 2016/0297999 A1 * | 10/2016 | Carvajal | ............... C08G 77/24 |
| 2018/0118939 A1 * | 5/2018 | Zou | ............... C08G 77/12 |

OTHER PUBLICATIONS

Abstract for CN 108102604 (Jun. 2018).*
PCT/US2016/066123 International Search Report dated Mar. 13, 2017, 3 pages.

* cited by examiner

*Primary Examiner* — Marc S Zimmer
(74) *Attorney, Agent, or Firm* — Warner Norcross + Judd LLP

(57) ABSTRACT

A silicone pressure-sensitive adhesive composition is curable by an addition reaction, condensation reaction, or a radical reaction with the use of an organic peroxide, and is characterized by comprising an azeotropic solvent such as a mixture of an aromatic solvent, and an aliphatic alcohol or an aliphatic ester. Although the silicone pressure-sensitive adhesive composition can be cured by heating at relatively low temperatures, the residual solvent in a silicone pressure-sensitive adhesive can be reduced.

14 Claims, No Drawings

SILICONE PRESSURE-SENSITIVE ADHESIVE COMPOSITION

CROSS-REFERENCE TO RELATED APPLICATIONS

This application is the National Stage of International Application No. PCT/US2016/066123 filed on 12 Dec. 2016, which claims priority to and all advantages of U.S. Provisional patent application Ser. No. 62/267,323 filed on 15 Dec. 2015, the content of which is hereby incorporated by reference.

TECHNICAL FIELD

The present invention relates to an silicone pressure-sensitive adhesive composition, especially a solvent type silicone pressure-sensitive adhesive composition.

BACKGROUND ART

As compared to acrylic pressure-sensitive adhesive compositions, silicone pressure-sensitive adhesive compositions are superior to the former in their electrical-insulation properties, resistance to heat, resistance to frost, and adhesion to various substrates. Therefore, the silicone pressure-sensitive adhesive compositions find application in the production of such goods as heat-resistant adhesive tapes, electrically insulating adhesive tapes, heat-seal tapes, masking tapes for metal plating, etc. In terms of mechanisms of curing, the silicone pressure-sensitive adhesive compositions can be divided into compositions curable by an addition reaction, condensation reaction, or a radical reaction with the use of organic peroxide, of which the silicone pressure-sensitive adhesive compositions curable by an addition reaction find more common application since they can be cured by merely retaining them at room temperature or by heating for acceleration of curing. Another advantage of these compositions is that they do not form by-products.

U.S. Pat. No. 5,190,827 discloses a silicone pressure-sensitive adhesive composition comprising: (A) a toluene soluble, resinous copolymer comprising $R_3SiO_{1/2}$ units and $SiO_{4/2}$ units, wherein R is an alkyl group or alkenyl group, (B) an alkenyl-terminated diorganopolysiloxane, (C) a hydride-terminated organohydrogenpolysiloxane, (D) a hydrogen-containing diorganopolysiloxane, (E) a hydrosilylation catalyast, and (F) an organic solvent. And U.S. patent application Publication Ser. No. 2011/0097579 discloses a silicone pressure-sensitive adhesive composition comprising: (A) a branched organopolysiloxane having on average at least two alkenyl groups on molecular terminals, (B) an organopolysiloxane composed of $R'R''_2SiO_{1/2}$ units and $SiO_{4/2}$ units, wherein R' represents an alkyl group, alkenyl groups, aryl groups, or a hydroxyl group, and R" represents an alkyl group, (C) an organohydrogenpolysiloxane having at least two silicon-bonded hydrogen atoms in a molecule, (D) a platinum-type catalyst, and (E) an organic solvent.

However, the silicone pressure-sensitive adhesive composition must be cured by heating at temperatures of at least 130° C. in order to convert them into the pressure-sensitive adhesive, wherein the residual solvent can be reduced. As a consequence, they cannot be used with poorly heat-tolerant substrates.

PRIOR ART DOCUMENTS

Patent Documents

Patent Document 1: U.S. Pat. No. 5,190,827
Patent Document 2: US Patent Application Publication No. 2011/0097579

SUMMARY OF INVENTION

Technical Problem

An object of the present invention is to provide a silicone pressure-sensitive adhesive composition which can be cured at relatively low temperatures into a pressure-sensitive adhesive having a reduced residual solvent.

Solution to Problem

The silicone pressure-sensitive adhesive composition of the present invention characterized by comprising an azeotropic solvent.

The silicone pressure-sensitive adhesive composition may be curable by an addition reaction, condensation reaction, or a radical reaction with the use of an organic peroxide.

The azeotropic solvent may be composed of an aromatic solvent, and an aliphatic alcohol with at least three carbon atoms or an aliphatic ester, preferably, the aromatic solvent is toluene, xylene, or a mixture thereof, the aliphatic alcohol is isopropyl alcohol, and the aliphatic ester is methyl acetate, ethyl acetate, or a mixture thereof.

The silicone pressure-sensitive adhesive composition may comprise:
(A) a diorganopolysiloxane having at least two alkenyl groups with 2 to 12 carbon atoms in a molecule, in an amount of 30 to 95 parts by mass;
(B) an organopolysiloxane composed of a $R^1{}_3SiO_{1/2}$ unit and $SiO_{4/2}$ unit, wherein $R^1$s independently represent monovalent hydrocarbon groups with 1 to 12 carbon atoms, and having a molar ratio ($R^1{}_3SiO_{1/2}$ unit)/($SiO_{4/2}$ unit) of 0.6 to 1.7, in an amount of 5 to 70 parts by mass, wherein the total amount of components (A) and (B) is 100 parts by mass;
(C) an organohydrogenpolysiloxane having at least two silicon-bonded hydrogen atoms in a molecule, in such an amount that a molar ratio of the silicon-bonded hydrogen atoms in component (C) per the alkenyl groups in components (A) and (B) becomes 0.1 to 20;
(D) a hydrosilylation catalyst for the addition reaction of the alkenyl groups with the silicon-bonded hydrogen atoms, in an amount to enhance a hydrosilylation of the composition; and
(E) an azeotropic solvent in a sufficient amount to apply the composition to a substrate.

The silicone pressure-sensitive adhesive composition may further comprise (F) an inhibitor in an amount of from 0.001 to 50 parts by mass per 100 parts by mass of components (A) and (B).

Effects of Invention

Since the silicone pressure-sensitive adhesive composition of the present invention is characterized by comprising an azeotropic solvent, although the silicone pressure-sensitive adhesive composition can be cured by heating at relatively low temperatures, the residual solvent in a silicone pressure-sensitive adhesive can be reduced.

DETAILED DESCRIPTION OF THE INVENTION

The silicone pressure-sensitive adhesive composition of the present invention will be explained in detail.

The present composition is characterized by comprising an azeotropic solvent. The azeotropic solvent acts as a solvent for components of the present component, and is easy to be volatilized by heating the present component at relatively low temperatures. The azeotropic solvent is not limited, however, it may be composed of an aromatic solvent, and an aliphatic alcohol with at least three carbon atoms or an aliphatic ester. The content of the azeotropic solvent is not limited, but it may be in a sufficient amount to apply the composition to a substrate. It is preferably in an amount of from 25 to 400 parts by mass or from 50 to 200 parts by mass per 100 parts by mass of the composition other than the azeotropic solvent.

The aromatic solvent is exemplified by toluene, xylene, and a mixture thereof.

The aliphatic alcohol is exemplified by propyl alcohol, isopropyl alcohol, butyl alcohol, isobutyl alcohol, tert-butyl alcohol, and a mixture of thereof. The aliphatic alcohol is preferably isopropyl alcohol.

The aliphatic ester is exemplified by methyl acetate, ethyl acetate, and a mixture thereof. The aliphatic ester is preferably ethyl acetate.

The azeotropic solvent is preferably a mixture of an aromatic solvent and an aliphatic alcohol, or a mixture of an aromatic solvent and an aliphatic ester, more preferably a mixture of toluene, xylene, and isopropyl alcohol, or a mixture of toluene, xylene, and ethyl acetate. In case of the use the mixture of the aromatic solvent and the aliphatic alcohol, the content of the aromatic solvent may be in a range of from 20 to 70 mass % of the present composition the content of the aliphatic alcohol may be in a range of from 3 to 30 mass % of the present composition.

A cure type of the present composition is not limited, however, it may be an addition reaction, condensation reaction, or a radical reaction with the use of an organic peroxide. The cure type of the present composition is preferably an addition reaction, since it can be cured by heating at relatively low temperatures, and it does not form by-products.

The present composition curing by addition reaction may comprise:
(A) a diorganopolysiloxane having at least two alkenyl groups with 2 to 12 carbon atoms in a molecule, in an amount of 30 to 95 parts by mass;
(B) an organopolysiloxane composed of a $R^1_3SiO_{1/2}$ unit and $SiO_{4/2}$ unit, wherein $R^1$s independently represents monovalent hydrocarbon groups with 1 to 12 carbon atoms, and having a molar ratio ($R^1_3SiO_{1/2}$ unit)/($SiO_{4/2}$ unit) of 0.6 to 1.7, in an amount of 5 to 70 parts by mass, wherein the total amount of components (A) and (B) is 100 parts by mass;
(C) an organohydrogenpolysiloxane having at least two silicon-bonded hydrogen atoms in a molecule, in such an amount that a molar ratio of the silicon-bonded hydrogen atoms in component (C) per the alkenyl groups in components (A) and (B) becomes 0.1 to 20;
(D) a hydrosilylation catalyst for the addition reaction of the alkenyl groups with the silicon-bonded hydrogen atoms, in an amount to enhance a hydrosilylation of the composition; and
(E) an azeotropic solvent in a sufficient amount to apply the composition to a substrate.

Component (A) is the principal curable component of the present composition, and curing thereof proceeds by an addition reaction with component (C) under the catalytic activity of component (D).

Component (A) must have at least two alkenyl groups with 2 to 12 carbon atoms in a molecule. The alkenyl groups are exemplified by vinyl groups, allyl groups, butenyl groups, pentenyl groups, and hexenyl groups. The alkenyl groups are preferably vinyl groups. Silicon-bonded groups other than alkenyl groups in component (A) are not limited, however, are exemplified by monovalent hydrocarbon groups with 1 to 12 carbon atoms free aliphatic unsaturated bond. The monovalent hydrocarbon groups are exemplified by methyl groups, ethyl groups, propyl groups, or similar alkyl group; phenyl groups, tolyl groups, xylyl groups, or similar aryl groups; benzyl groups, phenethyl groups, or similar aralkyl groups; and 3-chloropropyl groups, 3,3,3-trifluoropropyl groups, or similar halogenated alkyl groups.

The molecular structure of component (A) is straight chain, however, it may be partially branched. The viscosity at 25° C. of component (A) is not limited, however, it is preferably at least 50 Pa s, and preferably at least 100 Pa s. In general it is called high viscosity silicone oil or silicone gum.

Component (B) in the present composition is an organopolysiloxane which imparts tack to the cured pressure-sensitive adhesive. In the above formula for the siloxane units of component (B), $R^1$s independently represents monovalent hydrocarbon groups with 1 to 12 carbon atoms. The monovalent hydrocarbon groups are exemplified by methyl groups, ethyl groups, propyl groups, or similar alkyl group; vinyl groups, allyl groups, butenyl groups, pentenyl groups, hexenyl groups, or similar alkenyl groups; phenyl groups, tolyl groups, xylyl groups, or similar aryl groups; benzyl groups, phenethyl groups, or similar aralkyl groups; and 3-chloropropyl groups, 3,3,3-trifluoropropyl groups, or similar halogenated alkyl groups. Preferably all of $R^1$ are methyl groups. Component (B) Component (B) may have residual silanol groups which arise from the hydrolysis of reactive silanes that are used to prepare component (B).

The molar ratio of $R^1_3SiO_{1/2}$ units to $SiO_{4/2}$ units in component (B) falls within the range of 0.6 to 1.7, preferably within the range of 0.6 to 1.5. This is because when the molar ratio is greater than or equal to the lower limit of the aforementioned range, the tackiness of the pressure-sensitive adhesive is improved, and when the molar ratio is less than or equal to the upper limit of the aforementioned range, the cohesive strength is improved.

Methods for synthesizing such organopolysiloxanes are known. The disclosures of U.S. Pat. Nos. 2,676,182 and 3,284,406 are incorporated herein by reference to show the preparation of organopolysiloxanes which are suitable as component (B) in the present composition.

Component (A) is added in an amount of 30 to 95 parts by mass, and component (B) is added in an amount of 5 to 70 parts by mass, wherein the total amount of components (A) and (B) is 100 parts by mass. This is because when the content of component (B) is greater than or equal to the lower limit of the aforementioned range, the tackiness of the pressure-sensitive adhesive is improved, and when the content of component (B) is less than or equal to the upper limit of the aforementioned range, the cohesive strength is improved.

Component (C) in the present composition is the component which functions as the crosslinker curing agent for component (A). Curing proceeds by the addition reaction of the silicon-bonded hydrogen atoms in this component with the alkenyl groups in component (A) under the catalytic activity of component (D).

Component (C) can be any of the currently known organohydrogenpolysiloxanes having at least two silicon-bonded hydrogen atoms in a molecule. The molecular structure of component (C) is not limited and can be cyclic, linear, branched and/or network, as desired. Silicon-bonded groups other than hydrogen atoms may be monovalent hydrocarbon groups free aliphatic unsaturated bond. The monovalent hydrocarbon groups are exemplified by methyl groups, ethyl groups, propyl groups, or similar alkyl group; phenyl groups, tolyl groups, xylyl groups, or similar aryl groups; benzyl groups, phenethyl groups, or similar aralkyl groups; and 3-chloropropyl groups, 3,3,3-trifluoropropyl groups, or similar halogenated alkyl groups.

The quantity of component (C) is sufficient to provide from 0.1 to 20 silicon-bonded hydrogen atoms per the alkenyl group in component (A), and preferably from 0.1 to 10 silicon-bonded hydrogen atoms, or from 0.5 to 10 silicone-bonded hydrogen atoms. This is because when the content of component (C) is within the aforementioned range, the present composition can be cured sufficiently.

Component (D) is a platinum-containing catalyst, and it promotes the addition reaction of component (A) with component (C). Component (D) is exemplified by chloroplatinic acid, chloroplatinic acid-olefin complexes, chloroplatinic acid-vinylsiloxane complexes, and platinum supported on a microparticulate carrier such as alumina.

Component (D) is added in a quantity sufficient to enhance a hydrosilylation reaction of the present composition, and preferable in a quantity sufficient to give from 0.1 to 1000, and preferably 1 to 300, parts by mass of platinum for every one million parts by mass of the combined quantity of components (A) through (C). The crosslinking reaction will be unsatisfactory at below 0.1 part by mass, and the cohesive strength will thus be reduced, while exceeding 1,000 parts by mass is disadvantageous due to the resulting short use time and high cost.

Component (E) functions to dissolve components (A) through (D) so the present composition may be easily applied to various substrates, and it is easy to be volatilized by heating the present component at relatively low temperatures. Component (E) is not limited, however, it may be composed of an aromatic solvent, and an aliphatic alcohol with at least three carbon atoms or an aliphatic ester. The aromatic solvent is exemplified by toluene, xylene, and a mixture thereof. The aliphatic alcohol is exemplified by propyl alcohol, isopropyl alcohol, butyl alcohol, isobutyl alcohol, tert-butyl alcohol, and a mixture of thereof. The aliphatic alcohol is preferably isopropyl alcohol. The aliphatic ester is exemplified by methyl acetate, ethyl acetate, and a mixture thereof. The aliphatic ester is preferably methyl acetate. The azeotropic solvent is preferably a mixture of an aromatic solvent and an aliphatic alcohol, or a mixture of an aromatic solvent and an aliphatic ester, more preferably a mixture of toluene, xylene, and isopropyl alcohol, or a mixture of toluene, xylene, and methyl acetate.

Component (E) is added in a sufficient amount to apply the composition to a substrate, but preferably in an amount of from 25 to 400 parts by mass or from 50 to 200 parts by mass per 100 parts by mass of components (A) through (C). This is because when the content of component (E) is greater than or equal to the lower limit of the aforementioned range, the viscosity of the present composition is reduced, and when the content of component (E) is less than or equal to the upper limit of the aforementioned range, thick silicone pressure-sensitive adhesive layer on a substrate can be formed.

In addition to components (A) through (E), an inhibitor (F) known in the art may be added to the present composition. Component (F) is exemplified by 3-methyl-1-butyn-3-ol, 3,5-dimethyl-1-hexyn-3-ol, 3-methyl-1-pentyn-3-ol, 1-ethynyl-1-cyclohexanol, 3-phenyl-1-butyn-3-ol, or a similar alkyne alcohol; 3-methyl-3-penten-1-yne, 3,5-dimethyl-1-hexen-3-yne, or a similar en-yne compound; 1,3,5,7-tetramethyl-1,3,5,7-tetravinylcyclotetrasiloxane, 1,3,5,7-tetramethyl-1,3,5,7-tetrahexenylcyclotetrasiloxane, or a similar methylalkenylsiloxane compound; alkyl and substituted alkyl maleates, or similar unsaturated ester; or benzotriazole. The content of component (F) may be in an amount of 0.001 to 5 part by mass per 100 parts by mass of components (A) and (B).

Furthermore, the addition of small quantities of supplementary components to the present composition is permissible. Such supplementary components are, for example, the various antioxidants, pigments, stabilizers, fillers, etc.

The present composition is applied onto a tape-like or a sheet-like substrate and is cured by heating at relatively low temperatures, especially at temperature ranging from 50° C. to 100° C., whereby a pressure-sensitive adhesive layer is formed on the aforementioned substrate. The substrate may be made from different materials such as single paperboard, corrugated paperboard, clay-coated paper, polyolefin-laminated paper, especially polyethylene-laminated paper, synthetic-resin film, natural-fiber web, synthetic-fiber web, artificial leather, or metal foil. The most preferable substrate is a synthetic film, such as polyimide, polyethylene, polypropylene, polystyrene, polyvinylchloride, polycarbonate, polyethylene terephthalate, or Nylon. When heat-resistant properties are essential, it is preferable to use a substrate in the form of a film made from polyimide, polyether-etherketone (PEEK), polyethylene naphthalate (PEN), liquid-crystal polyallylate, polyamidoimide (PAI), polyether sulfone (PES), or a similar heat-resistant synthetic resin.

EXAMPLES

The silicone pressure-sensitive composition of the present invention will be described in detail hereinafter using Practical Examples and Comparative Examples. However, the present invention is not limited by the description of the below listed Practical Examples. Viscosities were measured at 25° C.

[Practical Examples 1 to 10 and Comparative Examples 1 to 6]

The silicone pressure-sensitive adhesive compositions shown in Table 1 were prepared using the components mentioned below. Moreover, in Table 1, "SiH/Vi" represents the total moles of silicon-bonded hydrogen atoms in component (C) per 1 mole of total vinyl groups in components (A) and (B).

The following components were used as component (A).
Component (a-1): a gum-like dimethylvinylsiloxy-terminated dimethylsiloxane-methylvinylsiloxane copolymer (content of vinyl groups: 0.07 mass %)
Component (a-2): a dimethylvinylsiloxy-terminated dimethylpolysiloxane having a viscosity of 50 Pa·s (content of vinyl groups: 0.09 mass %)

The following component was used as component (B).
Component (b-1): an organopolysiloxane composed of $(CH_3)_3SiO_{1/2}$ units and $SiO_{4/2}$ units having a molar ratio $[(CH_3)_3SiO_{1/2}$ unit$]/[SiO_{4/2}$ unit$]$ of 1.0, and having a content of silanol groups of 1.5 mass % and a weight average molecular weight of about 20,000

The following component was used as component (C).
Component (c-1): a methylhydrogenpolysiloxane capped at both molecular terminals with trimethylsiloxy groups and having a viscosity of 20 mPa·s The following components were used as component (D).
Component (d-1): Pt-1,3-divinyl-1,1,3,3-tetramethyldisiloxane complex The following components were used as component (E).
Component (e-1): xylene
Component (e-2): toluene
Component (e-3): ethyl acetate
Component (e-4): isopropyl alcohol
Component (e-5): methanol The following component was used as component (F).
Component (f-1): 3-methyl-1-butyn-3-ol The properties reported in the Examples were measured by the following methods.

[Measurement of Adhesive Strength]

The silicone pressure-sensitive adhesive composition was coated in 25 μm thickness on the PET substrates, followed by curing at 80° C. for 2 min. The resulting pressure-sensitive tape was pressed, using a 2 kg rubber roller, onto PET film. After standing for 1 hour at room temperature, the sample was peeled using a tensile tester (Tensilon from Toyo-Baldwin Kabushiki Kaisha) at a rate of 0.3 m/minute in order to measure the adhesive strength, which is expressed in units of gf/20 mm.

[Measurement of Volatiles]

Weigh duplicate samples into tared aluminum dishes. All weights should be to one part per thousand. Place the dishes in a forced draft oven which has stabilized at 150° C. After 1 hr. has elapsed in the oven, remove the dish and allow the dish to cool to room temperature and reweigh. Calculate percent volatile or non-volatile as required.

TABLE 1

| | | Practical Example 1 | Practical Example 2 |
|---|---|---|---|
| Silicone Pressure-sensitive Adhesive Composition (mass %) | Component (a-1) | 4.17 | 4.17 |
| | Component (a-2) | 16.66 | 16.66 |
| | Component (b-1) | 18.73 | 18.73 |
| | Component (c-1) | 0.40 | 0.40 |
| | Component (d-1)* | 100 | 100 |
| | Component (e-1) | 9.83 | 9.83 |
| | Component (e-2) | 41.60 | 28.74 |
| | Component (e-3) | — | — |
| | Component (e-4) | 8.57 | 21.43 |
| | Component (e-5) | — | — |
| | Component (f-1) | 0.04 | 0.04 |
| SiH/Vi | | 9.43 | 9.43 |
| Appearance | | Haze | Haze |
| Adhesion to PET (gf/20 mm) | Cured at 80° C. | 55 | 57 |
| | Cured at 130° C. | 53 | 55 |
| GC Headspace (Cured at 80° C.) (ppm) | Solvent | 1006 | 661 |
| | Others | 876 | 590 |
| | Total | 1882 | 1251 |
| GC Headspace (Cured at 130° C.) (ppm) | Solvent | 602.5 | 550.7 |
| | Others | 10.2 | 20.7 |
| | Total | 612.7 | 571.4 |

TABLE 1-continued

| | | Practical Example 3 | Practical Example 4 | Practical Example 5 |
|---|---|---|---|---|
| Silicone Pressure-sensitive Adhesive Composition (mass %) | Component (a-1) | 4.17 | 4.17 | 4.17 |
| | Component (a-2) | 16.66 | 16.66 | 16.66 |
| | Component (b-1) | 18.73 | 18.73 | 18.73 |
| | Component (c-1) | 0.40 | 0.40 | 0.40 |
| | Component (d-1)* | 100 | 100 | 100 |
| | Component (e-1) | 9.83 | 9.83 | 9.83 |
| | Component (e-2) | 41.60 | 28.74 | 15.88 |
| | Component (e-3) | 8.57 | 21.43 | 34.29 |
| | Component (e-4) | — | — | — |
| | Component (e-5) | — | — | — |
| | Component (f-1) | 0.04 | 0.04 | 0.04 |
| SiH/Vi | | 9.43 | 9.43 | 9.43 |
| Appearance | | Clear | Clear | Clear |
| Adhesion to PET (gf/20 mm) | Cured at 80° C. | 67 | 78 | 209 |
| | Cured at 130° C. | 53 | 61 | 86 |
| GC Headspace (Cured at 80° C.) (ppm) | Solvent | 792 | 1025 | 637 |
| | Others | 648 | 741 | 528 |
| | Total | 1440 | 1766 | 1165 |
| GC Headspace (Cured at 130° C.) (ppm) | Solvent | 585 | 464.5 | 589.8 |
| | Others | 9 | 5.8 | 6.2 |
| | Total | 594 | 470.3 | 596 |

| | | Comparative Example 1 | Comparative Example 2 | Comparative Example 3 |
|---|---|---|---|---|
| Silicone Pressure-sensitive Adhesive Composition (mass %) | Component (a-1) | 4.17 | 4.17 | 4.17 |
| | Component (a-2) | 16.66 | 16.66 | 16.66 |
| | Component (b-1) | 18.73 | 18.73 | 18.73 |
| | Component (c-1) | 0.40 | 0.40 | 0.40 |
| | Component (d-1)* | 100 | 100 | 100 |
| | Component (e-1) | 9.83 | 9.83 | 9.83 |
| | Component (e-2) | 41.60 | 28.74 | 15.88 |
| | Component (e-3) | — | — | — |
| | Component (e-4) | — | — | — |
| | Component (e-5) | 8.57 | 21.43 | 34.29 |
| | Component (f-1) | 0.04 | 0.04 | 0.04 |
| SiH/Vi | | 9.43 | 9.43 | 9.43 |
| Appearance | | Not Miscible | Not Miscible | Not Miscible |
| Adhesion to PET (gf/20 mm) | Cured at 80° C. | Not Applicable | Not Applicable | Not Applicable |
| | Cured at 130° C. | Not Applicable | Not Applicable | Not Applicable |
| GC Headspace (Cured at 80° C.) (ppm) | Solvent | Not Applicable | Not Applicable | Not Applicable |
| | Others | Not Applicable | Not Applicable | Not Applicable |
| | Total | Not Applicable | Not Applicable | Not Applicable |
| GC Headspace (Cured at 130° C.) (ppm) | Solvent | Not Applicable | Not Applicable | Not Applicable |
| | Others | Not Applicable | Not Applicable | Not Applicable |
| | Total | Not Applicable | Not Applicable | Not Applicable |

| | | Practical Example 6 | Practical Example 7 |
|---|---|---|---|
| Silicone Pressure-sensitive Adhesive Composition (mass %) | Component (a-1) | 7.19 | 7.19 |
| | Component (a-2) | 28.77 | 28.77 |
| | Component (b-1) | 3.59 | 3.59 |
| | Component (c-1) | 1.89 | 1.89 |
| | Component (d-1)* | 100 | 100 |
| | Component (e-1) | 1.89 | 1.89 |
| | Component (e-2) | 49.54 | 36.68 |
| | Component (e-3) | — | — |
| | Component (e-4) | 8.57 | 21.43 |
| | Component (e-5) | — | — |
| | Component (f-1) | 0.04 | 0.04 |

TABLE 1-continued

|  |  |  |  |
|---|---|---|---|
| SiH/Vi |  | 9.43 | 9.43 |
| Appearance |  | Haze | Haze |
| Adhesion to PET (gf/20 mm) | Cured at 80° C. | 2.2 | 2.2 |
|  | Cured at 130° C. | 2.6 | 2.7 |
| GC Headspace (Cured at 80° C.) (ppm) | Solvent | 829 | 520 |
|  | Others | 506 | 386 |
|  | Total | 1336 | 906 |
| GC Headspace (Cured at 130° C.) (ppm) | Solvent | 585.1 | 539.2 |
|  | Others | 21.8 | 16.3 |
|  | Total | 606.9 | 555.6 |

|  |  | Practical Example 8 | Practical Example 9 | Practical Example 10 |
|---|---|---|---|---|
| Silicone Pressure-sensitive Adhesive Composition (mass %) | Component (a-1) | 7.19 | 7.19 | 7.19 |
|  | Component (a-2) | 28.77 | 28.77 | 28.77 |
|  | Component (b-1) | 3.59 | 3.59 | 3.59 |
|  | Component (c-1) | 1.89 | 1.89 | 1.89 |
|  | Component (d-1)* | 100 | 100 | 100 |
|  | Component (e-1) | 1.89 | 1.89 | 1.89 |
|  | Component (e-2) | 49.54 | 36.68 | 23.82 |
|  | Component (e-3) | 8.57 | 21.43 | 34.29 |
|  | Component (e-4) | — | — | — |
|  | Component (e-5) | — | — | — |
|  | Component (f-1) | 0.04 | 0.04 | 0.04 |
| SiH/Vi |  | 9.43 | 9.43 | 9.43 |
| Appearance |  | Clear | Clear | Clear |
| Adhesion to PET (gf/20 mm) | Cure at 80° C. | 2.5 | 2.5 | 3.7 |
|  | Cured at 130° C. | 2.3 | 2.4 | 2.6 |
| GC Headspace (Cured at 80° C.) (ppm) | Solvent | 825 | 662 | 687 |
|  | Others | 444 | 356 | 366 |
|  | Total | 1269 | 1017 | 1053 |
| GC Headspace (Cured at 130° C.) (ppm) | Solvent | 539.3 | 496 | 423 |
|  | Others | 17.9 | 14.4 | 9.6 |
|  | Total | 557.2 | 510.4 | 432.5 |

|  |  | Comparative Example 4 | Comparative Example 5 | Comparative Example 6 |
|---|---|---|---|---|
| Silicone Pressure-sensitive Adhesive Composition (mass %) | Component (a-1) | 7.19 | 7.19 | 7.19 |
|  | Component (a-2) | 28.77 | 28.77 | 28.77 |
|  | Component (b-1) | 3.59 | 3.59 | 3.59 |
|  | Component (c-1) | 1.89 | 1.89 | 1.89 |
|  | Component (d-1)* | 100 | 100 | 100 |
|  | Component (e-1) | 1.89 | 1.89 | 1.89 |
|  | Component (e-2) | 49.54 | 36.68 | 23.82 |
|  | Component (e-3) | — | — | — |
|  | Component (e-4) | — | — | — |
|  | Component (e-5) | 8.57 | 21.43 | 34.29 |
|  | Component (f-1) | 0.04 | 0.04 | 0.04 |
| SiH/Vi |  | 9.43 | 9.43 | 9.43 |
| Appearance |  | Not Miscible | Not Miscible | Not Miscible |
| Adhesion to PET (gf/20 mm) | Cured at 80° C. | Not Applicable | Not Applicable | Not Applicable |
|  | Cured at 130° C. | Not Applicable | Not Applicable | Not Applicable |
| GC Headspace (Cured at 80° C.) (ppm) | Solvent | Not Applicable | Not Applicable | Not Applicable |
|  | Others | Not Applicable | Not Applicable | Not Applicable |
|  | Total | Not Applicable | Not Applicable | Not Applicable |
| GC Headspace (Cured at 130° C.) (ppm) | Solvent | Not Applicable | Not Applicable | Not Applicable |
|  | Others | Not Applicable | Not Applicable | Not Applicable |
|  | Total | Not Applicable | Not Applicable | Not Applicable |

*platinum content (ppm) of total mass of components (A) through (C)

INDUSTRIAL APPLICABILITY

The silicone pressure-sensitive adhesive composition of the present invention is useful in preparing articles such as pressure-sensitive tapes, labels, emblems and other decorative or informational signs.

The invention claimed is:

1. A silicone pressure-sensitive adhesive composition comprising:
   (A) a diorganopolysiloxane having at least two alkenyl groups with 2 to 12 carbon atoms in a molecule, in an amount of from 30 to 95 parts by mass;
   (B) an organopolysiloxane comprising $R^1_3SiO_{1/2}$ and $SiO_{4/2}$ units, wherein $R^1$s independently represent monovalent hydrocarbon groups with 1 to 12 carbon atoms, and having a molar ratio of $(R^1_3SiO_{1/2})/(SiO_{4/2})$ units of 0.6 to 1.7, in an amount of from 5 to 70 parts by mass;
   (C) an organohydrogenpolysiloxane having at least two silicon-bonded hydrogen atoms in a molecule, in such an amount that a molar ratio of the silicon-bonded hydrogen atoms in component (C) per the alkenyl groups in components (A) and (B) is 0.1 to 20;
   (D) a hydrosilylation catalyst for the addition reaction of the alkenyl groups with the silicon-bonded hydrogen atoms, in an amount to enhance a hydrosilylation of the composition; and
   (E) an azeotropic solvent;
     wherein the total amount of components (A) and (B) is 100 parts by mass; and
     wherein the azeotropic solvent (E) is present in a sufficient amount to apply the composition to a substrate.

2. The silicone pressure-sensitive adhesive composition of claim 1, wherein the azeotropic solvent comprises an aromatic solvent, and an aliphatic alcohol with at least three carbon atoms or an aliphatic ester.

3. The silicone pressure-sensitive adhesive composition of claim 2, wherein the aromatic solvent is toluene, xylene, or a mixture thereof.

4. The silicone pressure-sensitive adhesive composition of claim 2, wherein the aliphatic alcohol is present and is isopropyl alcohol.

5. The silicone pressure-sensitive adhesive composition of claim 2, wherein the aliphatic ester is present and is methyl acetate, ethyl acetate, or a mixture thereof.

6. The silicone pressure-sensitive adhesive composition of claim 1, further comprising (F) an inhibitor.

7. The silicone pressure-sensitive adhesive composition of claim 6, wherein component (F) is present in an amount of from 0.001 to 50 parts by mass per 100 parts by mass of components (A) and (B).

8. The silicone pressure-sensitive adhesive composition of claim 1, wherein component (E) comprises an aromatic solvent and an aliphatic alcohol with at least three carbon atoms.

9. The silicone pressure-sensitive adhesive composition of claim 8, wherein the aromatic solvent is toluene, xylene, or a mixture thereof, and the aliphatic alcohol is isopropyl alcohol.

10. The silicone pressure-sensitive adhesive composition of claim 1, wherein component (E) comprises an aromatic solvent and an aliphatic ester.

11. The silicone pressure-sensitive adhesive composition of claim 10, wherein the aromatic solvent is toluene, xylene, or a mixture thereof, and the aliphatic ester is methyl acetate, ethyl acetate, or a mixture thereof.

12. A silicone pressure-sensitive adhesive formed from the silicone pressure-sensitive adhesive composition according to claim 1.

13. A composite article comprising a silicone pressure-sensitive adhesive layer disposed on a substrate, wherein the silicone pressure-sensitive adhesive layer is formed from the silicone pressure-sensitive adhesive composition according to claim 1.

14. A method of forming the composite article according to claim 13, the method comprising:
   applying the silicone pressure-sensitive adhesive composition to the substrate; and
   curing the silicone pressure-sensitive adhesive composition to form the silicone pressure-sensitive adhesive layer on the substrate.

\* \* \* \* \*